US010171955B2

(12) United States Patent
Schultz et al.

(10) Patent No.: US 10,171,955 B2
(45) Date of Patent: Jan. 1, 2019

(54) METHOD FOR COMMUNICATION BETWEEN VEHICLES

(71) Applicant: VOLKSWAGEN AG, Wolfsburg (DE)

(72) Inventors: Holger Schultz, Falkensee (DE); Thomas Biehle, Groß Oesingen (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/721,761

(22) Filed: Sep. 30, 2017

(65) Prior Publication Data

US 2018/0098203 A1 Apr. 5, 2018

(30) Foreign Application Priority Data

Sep. 30, 2016 (DE) .................. 10 2016 218 982

(51) Int. Cl.
| | |
|---|---|
| *H04W 4/40* | (2018.01) |
| *H04W 4/44* | (2018.01) |
| *H04W 4/04* | (2009.01) |
| *H04L 9/32* | (2006.01) |
| *H04W 4/12* | (2009.01) |
| *H04W 4/08* | (2009.01) |
| *H04W 8/18* | (2009.01) |

(Continued)

(52) U.S. Cl.
CPC ............ *H04W 4/046* (2013.01); *G06F 21/43* (2013.01); *G08G 1/096716* (2013.01); *G08G 1/096725* (2013.01); *G08G 1/096741* (2013.01); *G08G 1/096758* (2013.01); *G08G 1/096775* (2013.01); *G08G 1/096791* (2013.01); *H04L 9/32* (2013.01); *H04L 63/0421* (2013.01); *H04W 4/08* (2013.01); *H04W 4/12* (2013.01); *H04W 8/186* (2013.01); *H04W 4/46* (2018.02)

(58) Field of Classification Search
CPC ....... H04W 4/046; H04W 4/08; H04W 8/186; H04W 4/40; H04W 4/44; H04W 4/46; H04W 4/48; H04B 1/3822
See application file for complete search history.

(56) References Cited

U.S. PATENT DOCUMENTS

| 9,042,873 B2 | 5/2015 | Basir |
| 2007/0162550 A1 | 7/2007 | Rosenberg |

(Continued)

FOREIGN PATENT DOCUMENTS

| DE | 19914906 A1 | 10/2000 |
| DE | 102005018301 A1 | 10/2006 |

(Continued)

OTHER PUBLICATIONS

Search Report for German Patent Application No. 10 2016 218 982A, dated May 23, 2017.

*Primary Examiner* — Andrew Wendell
(74) *Attorney, Agent, or Firm* — Barnes & Thornburg LLP

(57) ABSTRACT

A method for the communication of vehicles including receiving a first message from a first vehicle by a second vehicle via vehicle-to-vehicle communication and/or vehicle-to-infrastructure communication and allocating the first message to the first vehicle based on the content of the first message by the second vehicle The method includes sending a second message from the second vehicle to the first vehicle via a separate communication channel by using information from the first message. Also disclosed is a method for vehicles to exchange data unrelated to traffic with one another.

15 Claims, 1 Drawing Sheet

(51) Int. Cl.
*G06F 21/43* (2013.01)
*H04L 29/06* (2006.01)
*G08G 1/0967* (2006.01)
*H04W 4/46* (2018.01)

(56) References Cited

U.S. PATENT DOCUMENTS

| | | | | |
|---|---|---|---|---|
| 2008/0268870 A1* | 10/2008 | Houri | ................ | G01S 5/0252 |
| | | | | 455/456.1 |
| 2011/0121991 A1 | 5/2011 | Basir | | |
| 2015/0049940 A1* | 2/2015 | Siegel | ................ | G08G 1/0175 |
| | | | | 382/165 |
| 2015/0296411 A1* | 10/2015 | Meyer | ................ | G08G 1/0112 |
| | | | | 370/336 |
| 2015/0312353 A1* | 10/2015 | Chen | ................ | H04W 4/046 |
| | | | | 709/228 |
| 2016/0087804 A1* | 3/2016 | Park | ................ | H04L 67/12 |
| | | | | 713/156 |
| 2016/0198466 A1* | 7/2016 | Yang | ................ | H04W 4/06 |
| | | | | 370/331 |
| 2017/0045369 A1* | 2/2017 | Kim | ................ | G01C 21/3685 |
| 2017/0090473 A1* | 3/2017 | Cooper | ................ | G05D 1/0027 |
| 2017/0111122 A1* | 4/2017 | Shimizu | ................ | H04W 4/027 |
| 2017/0181030 A1* | 6/2017 | Han | ................ | H04W 28/0289 |
| 2017/0337571 A1* | 11/2017 | Bansal | ................ | G07C 5/008 |

FOREIGN PATENT DOCUMENTS

| | | |
|---|---|---|
| DE | 102006032374 A1 | 5/2007 |
| DE | 102007054261 A1 | 5/2009 |
| DE | 102013201597 A1 | 8/2013 |
| DE | 102012208256 A1 | 11/2013 |
| DE | 102013226530 A1 | 6/2015 |
| DE | 102013226532 A1 | 6/2015 |
| DE | 102014110888 A1 | 2/2016 |

* cited by examiner

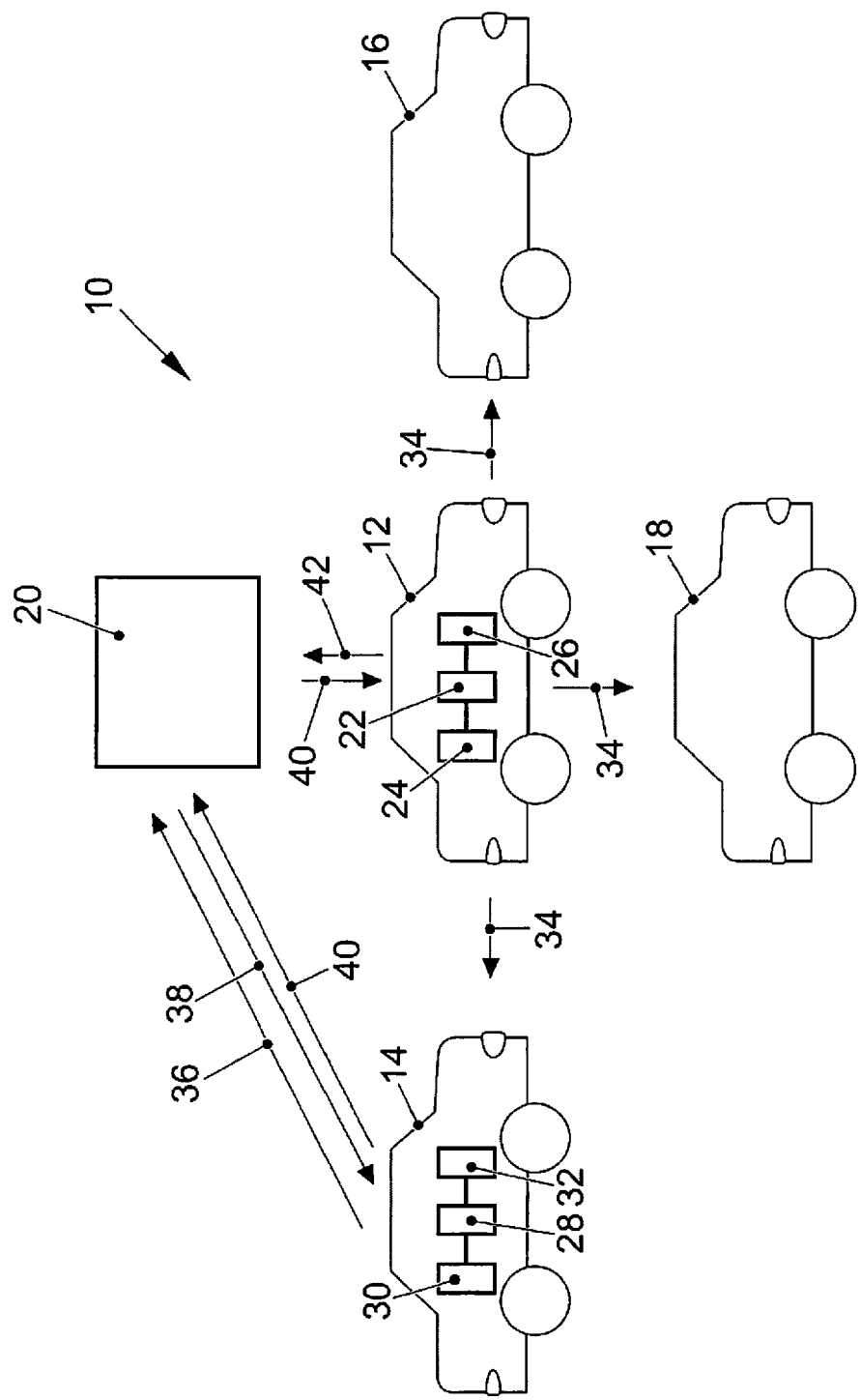

METHOD FOR COMMUNICATION BETWEEN VEHICLES

PRIORITY CLAIM

This patent application claims priority to German Patent Application No. 10 2016 218 982.4, filed 30 Sep. 2016, the disclosure of which is incorporated herein by reference in its entirety.

SUMMARY

Illustrative embodiments relate to a method for the communication of vehicles, to a vehicle and to a communication system.

BRIEF DESCRIPTION OF THE DRAWINGS

The disclosed embodiments will be explained below with reference to the accompanying drawing, in which:

FIG. 1 shows an exemplary embodiment of the disclosed communication system in a schematic representation.

DETAILED DESCRIPTION

Modern vehicles already have a plurality of communication interfaces, by which vehicles, for example, can communicate with one another or with remotely positioned central processors or servers. The mutual communication of the vehicles in this case usually takes place via short-distance radio and is called vehicle-to-vehicle communication. This communication can also include infrastructure facilities. The communication between vehicles and infrastructure facilities is called vehicle-to-infrastructure communication.

In the prior art, various approaches for implementing such a communication are known.

The printed document DE 10 2007 054 261 A1 proposes a system for direct data exchange between two or more vehicles for conveying data which reproduce events impairing the safety of driving. The data exchange takes place via wireless communication, a vehicle-individual security token, in which at least one vehicle identification information item is provided, being provided in each of the vehicles exchanging data.

From the printed document DE 10 2013 226 532 A1, a method for preparing and performing a trip of a plurality of vehicles combined to form a link-up, between which vehicles messages are sent with a vehicle identification by vehicle-to-X communication, is known. It is provided that before and/or during the trip, anonymized vehicle identifications are exchanged between the vehicles in the link-up and that during the trip, on the basis of the exchanged anonymous vehicle identifications, a vehicle from which a message is received is allocated to the link-up.

In addition, DE 10 2014 110 888 A1 proposes a vehicle information arrangement for a motor vehicle having a position locating unit, a radio communication unit and a data processing unit which can be connected to the position locating unit and the radio communication unit and to sensors of the motor vehicle. The data processing unit is configured to exchange in an end user mode anonymized motor vehicle-relevant information with an infrastructure available in public traffic during the operation of the motor vehicle by the radio communication unit.

The printed document DE 10 2006 032 374 A1 describes a method for collecting data in an inquiring vehicle from other vehicles in a decentralized network formed by communication devices of the vehicles with ad-hoc communication between the vehicles.

The printed document DE 10 2005 018 301 A1 describes a data transmission device for cooperative data exchange between mobile objects.

However, the known standards for implementing vehicle-to-vehicle communication and vehicle-to-infrastructure communication are exclusively provided for exchanging traffic-related data, for example, for improving highly automated or autonomous driving programs. The exchange of traffic-unrelated data, for example, to pass the time during the trip or to indicate vehicle damage to other road users, is not possible due to corresponding rules about the known standards of vehicle-to-vehicle communication and vehicle-to-infrastructure communication.

The disclosed embodiments create a possibility that vehicles can also exchange traffic-unrelated data with one another. The exchange of data should be anonymous.

The disclosed embodiments provide a method, a vehicle, and a communication system.

In the disclosed method for the communication of vehicles, a first message is received from a first vehicle by a second vehicle via vehicle-to-vehicle communication and/or vehicle-to-infrastructure communication and the first message is allocated to the first vehicle on the basis of the content of the first message by the second vehicle. According to the disclosed embodiments, the second vehicle then sends a second message to the first vehicle via a separate communication channel by using information from the first message.

The disclosed method sends the second message from the second vehicle to the first vehicle takes place via a separate communication channel so that the second message is not restricted to traffic-related data in its content. So that a vehicle occupant such as, for example, the vehicle driver can select the first vehicle from the vehicles surrounding the second vehicle to send a message to this vehicle, the received first message must be allocated to the first vehicle. For example, all vehicles from which the second vehicle has received vehicle-to-vehicle communication messages are optically displayed within the second vehicle, for instance, on a display or touchscreen. The individual vehicle-to-vehicle communication messages received are allocated to the respective vehicles by the second vehicle so that the corresponding vehicle to which a message is to be sent, i.e., the first vehicle in the present case, can be selected selectively.

The first message and/or the second message can be in each case anonymous messages. Due to the fact that the first message and/or the second message are in each case anonymous messages, the receiver of the first message or of the second message, respectively, cannot draw any conclusions regarding the identity of the sender. Due to data protection guidelines, the sending of anonymous messages is frequently recommended or even prescribed. Due to the fact that the first message and/or the second message are in each case anonymous messages, the method can also be used in communication environments which are subject to corresponding data protection guidelines.

The content of the first message, on the basis of which the first message is allocated to the first vehicle by the second vehicle, can comprise a vehicle-specific certificate, position data of the first vehicle at the time of sending the first message, a route history of the first vehicle and/or sensor data recorded by the first vehicle. Alternatively or additionally, the content of the first message, on the basis of which the first message is allocated to the first vehicle by the second vehicle, can also comprise other message attributes. Message contents which allow an allocation of a received message to a vehicle are regularly appended to a different message content in the vehicle-to-vehicle communication and are thus available. Optionally, the first vehicle cyclically sends out vehicle-to-vehicle communication messages and/or vehicle-to-infrastructure communication messages, for example, having a frequency in the range from 2 to 10 Hz. Optionally, the first message is a Co-operative Awareness Message (CAM). Alternatively or additionally, the first vehicle sends out vehicle-to-vehicle communication messages and/or vehicle-to-infrastructure communication messages when an event is detected such as, for example, congestion or an accident. The first message can be in this case a Decentralized Environmental Notification Message (DENM).

The sending of the second message from the second vehicle to the first vehicle via the separate communication channel by using information from the first message can comprise the acquisition of an identification feature in the first message by the second vehicle or a central processor, wherein the identification feature unambiguously allocates the first message to the first vehicle. Optionally, the addressing of the second message to the first vehicle is effected by the identification feature acquired in the first message. The identification feature thus represents the information from the first message, by the use of which the second message is sent by the second vehicle to the first vehicle via a separate communication channel. The identification feature can comprise a unique pseudonym and/or an identification code allocated to the vehicle. If the identification feature in the first message is acquired by the central processor the necessity exists that the second vehicle sends the first message or at least a part of the first message which includes the identification feature to the central processor. The central processor can be, for example, a back-end or server of a vehicle manufacturer or of a third provider.

Sending the second message from the second vehicle to the first vehicle via the separate communication channel by using information from the first message can comprise the sending of the second message from the second vehicle to a central processor and/or the sending of the second message from the central processor to the first vehicle. If the identification feature in the first message is acquired by the central processor, the first message or the part of the first message which contains the identification feature may be sent from the second vehicle to the central processor simultaneously with the sending of the second message from the second vehicle to the central processor or before the sending of the second message from the second vehicle to the central processor. The central processor may be configured to communicate with a multiplicity of vehicles. The central processor is configured to acquire within vehicle-to-vehicle communication messages and/or vehicle-to-infrastructure communication messages identification features of the transmitting vehicle and to forward a further message of a vehicle to the transmitting vehicle on the basis of the acquired identification feature.

The method can comprise the sending of a transmit authorization from the first vehicle to the central processor, the transmit authorization authorizing the central processor to forward messages of other vehicles to the first vehicle. For reasons of data protection and on the basis of any costs possibly arising for the exchange of data between the first vehicle and the central processor which arise from the forwarding of messages of other vehicles to the first vehicle, the necessity of granting such a transmit authorization is beneficial. For example, the vehicle driver and/or the vehicle keeper can be requested to grant such a transmit authorization at the first time of use of an application which is configured to carry out the method, described here, for the communication of vehicles. For example, the transmit authorization can be a general transmit authorization which authorizes the central processor to forward messages of all vehicles, or a limited transmit authorization which authorizes the central processor to forward messages only of selected vehicles.

The sending of the second message from the second vehicle to the first vehicle via the separate communication channel by using information from the first message can comprise the inquiring at the central processor by the second vehicle whether a transmit authorization from the first vehicle is present and/or the sending of a confirmation from the central processor to the second vehicle that a transmit authorization from the first vehicle is present. Due to the fact that the second vehicle has the possibility of inquiring at the central processor whether a transmit authorization of the first vehicle is present and thus messages of the second vehicle can be forwarded by the central processor to the first vehicle, it can be determined by the occupants or the vehicle driver of the second vehicle whether messages which are sent via the central processor to the first vehicle are allowed to be forwarded at all from the central processor to the first vehicle. Especially if the notification is given that no transmit authorization is present, the sending of messages to the first vehicle can be omitted.

The first message can comprise traffic-related information. Alternatively or additionally, the second message can comprise traffic-unrelated information, optionally exclusively traffic-unrelated information. Traffic-related information is such information which is relevant to the traffic safety and/or usable by a driver assistance system. Traffic-unrelated data can comprise, for example, notes with respect to the behavior and/or driving style of other road users, data for implementing games, in particular multiplayer games by vehicle-related systems and/or traffic-unrelated conversations. The vehicle-to-vehicle communication and/or vehicle-to-infrastructure communication between the first vehicle and the second vehicle can be based on short-distance radio. The short-distance radio can use, for example, the WLANp standard, that is to say the IEEE. 802.11p standard. Alternatively or additionally, the communication of the first vehicle and/or of the second vehicle with the central processor can be based on mobile radio and/or the Internet.

The first vehicle can respond to the second vehicle also via the method described. For this purpose, the second vehicle carries out the operations previously described with reference to the first vehicle and the second vehicle carries out the operations previously described with reference to the first vehicle. Furthermore, the method can also be used analogously for communication of a vehicle with infrastructure facilities such as payment systems of multi-story car-parks.

The disclosed vehicle comprises a first communication module and a second communication module. The first communication module is used for vehicle-to-vehicle communication and/or for vehicle-to-infrastructure communication. The second communication module is used for communication with a central processor. According to the disclosed embodiments, the vehicle is configured to carry out the method for the communication of vehicles according to at least one of the embodiments described above as first vehicle and/or as second vehicle. The same benefits and modifications apply as previously described.

The disclosed communication system comprises a first vehicle and a second vehicle. According to the disclosed embodiments, the communication system is configured to carry out the method for the communication of vehicles according to at least one of the embodiments described above. The communication system may additionally comprise a central processor. The same benefits and modifications as described before apply.

Further embodiments are obtained from the remaining features mentioned in the subclaims. The various embodiments mentioned in this application can be combined with one another unless stated differently in the individual case.

FIG. 1 shows a communication system 10 comprising a first vehicle 12, a second vehicle 14, two other vehicles 16, 18 and a central processor 20.

All the vehicles 12-18 are configured to communicate with one another via vehicle-to-vehicle communication and with infrastructure facilities on the periphery of the road via vehicle-to-infrastructure communication. In addition, all vehicles 12-18 are configured to communicate with the central processor 20.

The first vehicle 12 has a first communication module 24 for vehicle-to-vehicle communication and for vehicle-to-infrastructure communication and a second communication module 26 for communication with the central processor 20. The first communication module 24 and the second communication module 26 are connected to a control device 22 which controls the first communication module 24 and the second communication module 26.

The second vehicle 14 also has a first communication module 30 for vehicle-to-vehicle communication and for vehicle-to-infrastructure communication and a second communication module 32 for communication with the central processor 20. The first communication module 30 and the second communication module 32 are connected to a control device 28 which controls the first communication module 30 and the second communication module 32.

The first vehicle 12 sends a first message 34 to the vehicles 14-18 via vehicle-to-vehicle communication. The first message 34 comprises traffic-related data which are relevant to the traffic safety and can be utilized by driver assistance systems of the vehicles 14-18. In addition, the first message 34 contains an identification feature, the identification feature allocating the first message 34 unambiguously to the first vehicle 12. The identification feature is a vehicle identification code in the example shown.

The first message 34 from a first vehicle 12 is received by the second vehicle 14 and the other vehicles 16, 18 via vehicle-to-vehicle communication. The second vehicle 14 allocates the first message 34 to the first vehicle 12 on the basis of the content of the first message 34. The allocation of the first message 34 to the first vehicle 12 occurs on the basis of position data of the first vehicle 12 at the time of sending the first message 34 which have been sent as component of the first message 34. The first message is an anonymous message which does not allow the identity of the sender to be inferred.

The second vehicle 14 sends to the central processor 20 the first message 34 of the first vehicle 12 together with an inquiry as to whether a transmit authorization from the first vehicle 12 is present as a message 36. A transmit authorization of the first vehicle 12 authorizes the central processor 20 to forward messages of other vehicles to the first vehicle 12. The central processor 20 acquires the identification feature in the first message 34 and checks on the basis of this identification feature whether such a transmit authorization is present. The first vehicle 12 had previously sent such a transmit authorization to the central processor 20 with the message 42 so that the central processor 20 sends a confirmation that a transmit authorization from the first vehicle 12 is present to the second vehicle 14 with the message 38.

The second vehicle 14 thereupon sends a second message 40, which comprises traffic-unrelated data, to the central processor 20. The second message 40 can also comprise traffic-related data apart from the traffic-unrelated data. For example, the second message 40 comprises an image and/or a video sequence which contains traffic-related information. The central processor 20 then forwards the second message 40 to the first vehicle 12, the addressing of the second message 40 to the first vehicle 12 being carried out by the identification feature acquired in the first message 34.

Thus, the second vehicle 14 transmits the second message 40 by using information from the first message 34 via a separate communication channel, namely via the central processor 20, to the first vehicle 12. The vehicles 12-18 shown utilize short-distance radio for vehicle-to-vehicle communication and for vehicle-to-infrastructure communication and mobile radio and the Internet for communication with the central processor 20.

Due to the fact that the second message is sent by the second vehicle by using information from the first message via a separate communication channel to the first vehicle, a possibility is created that vehicles can also exchange traffic-unrelated data with one another.

LIST OF REFERENCE DESIGNATIONS

10 Communication system
12 First vehicle
14 Second vehicle
16 Vehicle
18 Vehicle
20 Central processor
22 Control device
24 First communication module
26 Second communication module
28 Control device
30 First communication module
32 Second communication module
34 First message
36 Message
38 Message
40 Second message
42 Message

The invention claimed is:

1. A method for the communication of vehicles, the method comprising:
   receiving a first message from a first vehicle by a second vehicle via vehicle-to-vehicle communication and/or vehicle-to-infrastructure communication;
   allocating the first message to the first vehicle based on the content of the first message by the second vehicle; and
   sending a second message from the second vehicle to the first vehicle via a separate communication channel by using information from the first message;
   wherein the sending of the second message from the second vehicle to the first vehicle via the separate communication channel by using information from the first message comprises at least one of the following operations:

sending the second message from the second vehicle to a central processor; and sending the second message from the central processor to the first vehicle.

2. The method of claim 1, wherein the first message and/or the second message are in each case anonymous messages.

3. The method of claim 1, wherein the content of the first message, based on which the first message is allocated to the first vehicle by the second vehicle, comprises a vehicle-specific certificate, position data of the first vehicle at the time of sending the first message, a route history of the first vehicle and/or sensor data recorded by the first vehicle.

4. The method of claim 1, wherein the sending of the second message from the second vehicle to the first vehicle via the separate communication channel by using information from the first message comprises:

acquiring an identification feature in the first message by the second vehicle or a central processor, wherein the identification feature unambiguously allocates the first message to the first vehicle, wherein the addressing of the second message to the first vehicle is effected by the identification feature acquired in the first message.

5. The method of claim 1, further comprising sending a transmit authorization from the first vehicle to the central processor, wherein the transmit authorization authorizes the central processor to forward messages of other vehicles to the first vehicle.

6. The method of claim 5, wherein the sending of the second message from the second vehicle to the first vehicle via the separate communication channel by using information from the first message comprises at least one of the following operations:

inquiring at the central processor by the second vehicle whether a transmit authorization from the first vehicle is present; and sending a confirmation from the central processor to the second vehicle that a transmit authorization from the first vehicle is present.

7. The method of claim 1, wherein the first message comprises traffic-related information and/or the second message comprises traffic-unrelated information.

8. A vehicle, comprising:

a first communication module for vehicle-to-vehicle communication and/or for vehicle-to-infrastructure communication; and a second communication module for communication with a central processor, wherein the vehicle carries out a method for communication of vehicles as first vehicle and/or as second vehicle, the vehicle configured to receive a first message from the first vehicle via vehicle-to-vehicle communication and/or vehicle-to-infrastructure communication;

allocate the first message to the first vehicle and send a second message to the first vehicle via a separate communication channel by using information from the first message;

wherein the second message is sent comprises at least one of the following operations:

sending the second message from the second vehicle to a central processor; and sending the second message from the central processor to the first vehicle.

9. A communication system comprising:

a central processor;

a first vehicle; and a second vehicle;

wherein the communication system carries out a method for communication of vehicles comprising:

receiving a first message from the first vehicle by the second vehicle via vehicle-to-vehicle communication and/or vehicle-to-infrastructure communication;

allocating the first message to the first vehicle based on the content of the first message by the second vehicle; and sending a second message from the second vehicle to the first vehicle via a separate communication channel by using information from the first message;

wherein the sending of the second message from the second vehicle to the first vehicle via the separate communication channel by using information from the first message comprises at least one of the following operations:

sending the second message from the second vehicle to a central processor; and sending the second message from the central processor to the first vehicle.

10. The system of claim 9, wherein the first message and/or the second message are in each case anonymous messages.

11. The system of claim 9, wherein the content of the first message, based on which the first message is allocated to the first vehicle by the second vehicle, comprises a vehicle-specific certificate, position data of the first vehicle at the time of sending the first message, a route history of the first vehicle and/or sensor data recorded by the first vehicle.

12. The system of claim 9, wherein the sending of the second message from the second vehicle to the first vehicle via the separate communication channel by using information from the first message comprises:

acquiring an identification feature in the first message by the second vehicle or a central processor, wherein the identification feature unambiguously allocates the first message to the first vehicle, wherein the addressing of the second message to the first vehicle is effected by the identification feature acquired in the first message.

13. The system of claim 9, wherein the method further comprises sending a transmit authorization from the first vehicle to the central processor, wherein the transmit authorization authorizes the central processor to forward messages of other vehicles to the first vehicle.

14. The system of claim 13, wherein the sending of the second message from the second vehicle to the first vehicle via the separate communication channel by using information from the first message comprises at least one of the following operations:

inquiring at the central processor by the second vehicle whether a transmit authorization from the first vehicle is present; and sending a confirmation from the central processor to the second vehicle that a transmit authorization from the first vehicle is present.

15. The system of claim 9, wherein the first message comprises traffic-related information and/or the second message comprises traffic-unrelated information.

* * * * *